United States Patent Office 3,592,670
Patented July 13, 1971

3,592,670
GYPSUM SLURRY SET ACCELERATION METHOD
Donald A. Kossuth, Buffalo, and Daniel A. Winkowski and John W. Klems, Tonawanda, N.Y., assignors to National Gypsum Company, Buffalo, N.Y.
No Drawing. Filed Feb. 3, 1969, Ser. No. 796,210
Int. Cl. C04b *11/14, 11/16*
U.S. Cl. 106—110                                   8 Claims

ABSTRACT OF THE DISCLOSURE

A method of accelerating the setting time of a calcined gypsum slurry during the manufacture of a gypsum product such as wallboard or the like comprising the use of an aqueous suspension of freshly hydrated, fine, calcium sulfate dihydrate crystals and a saturated calcium sulfate dihydrate solution, said saturated calcium sulfate dihydrate solution comprising a major percentage by volume of the total water content of the calcined gypsum slurry from which the said gypsum product is made.

BACKGROUND OF THE INVENTION

In the production of gypsum products, gypsum stucco, which is also referred to as calcined gypsum and which is calcium sulfate hemi-hydrate ($CaSO_4 \cdot \frac{1}{2} H_2O$), and other additives are admixed with water to make a slurry which is then formed into the desired shape, allowed to set and dried. The setting is a hydration reaction converting the stucco to set gypsum which is calcium sulfate dihydrate ($CaSO_4 \cdot 2H_2O$). Moderately quick setting calcined gypsum has a setting time of about twenty-five minutes which is undesirable for industrial production purposes. It is necessary to decrease the length of this setting period in order that economically practical production rates may be maintained for commercial manufacturing processes. It has therefore been standard industry practice to add an accelerator to the slurry from which the gypsum products are formed thereby causing the slurry to set within a few minutes. Various additives which will accomplish such a result are known. The most practical and economical method of acceleration of the setting time of a calcined gypsum slurry in the past was to disperse freshly ground, dry, calcium sulfate dihydrate particles uniformly throughout the slurry. Other chemical accelerator additives such as potassium sulfate were sometimes added to the slurry along with the dihydrate particles. A common method of obtaining these dihydrates particles was by grinding gypsum block, a product which is itself made from a calcined gypsum slurry. This method, however, has a number of disadvantages among them being that the ground block particles lose their accelerating potency rapidly upon aging. For this reason the grinding of the gypsum block had to be a continuous operation to ensure the availability of freshly ground material having maximum accelerating efficiency for addition to the slurry. The grinding operation was not always an efficient one and the dihydrate particles obtained in this manner did not always produce consistent results with respect to setting times.

Another method of accelerating the setting time of a calcined gypsum slurry consists of the use of freshly hydrated, fine, calcium sulfate dihydrate crystals formed by hydrating fine, gypsum stucco particles. These crystals are added to the calcined gypsum slurry in the form of a suspension in a saturated aqueous solution. By freshly hydrated, fine, calcium sulfate dihydrate crystals we mean that in order to realize substantially their full accelerating potency they must be used within no more than about five minutes from the time the suspension is formed. A common commercial method of forming this suspension is to add fine, gypsum stucco particles and water continuously to an accelerator tube which contains steel balls and has a means for agitating the mixture to form the aqueous suspension. The accelerator tube may be of varying dimensions dependent upon the quantity of the suspension which is required. A typical accelerator tube is about 20′ in length with a diameter of about 18″ and has a longitudinally extending internal rotor shaft. The rotor shaft has four equally spaced apart vanes projecting outwardly from its periphery and disposed substantially along the length of the shaft. These vanes extend about 3″ out from the shaft in directions which are perpendicular to a tangent of the shaft. The steel balls occupy about 33% of the available space within the accelerator tube. The accelerator tube has an opening which allows the aqueous suspension of crystals to continuously flow out into the calcined gypsum slurry.

The aqueous suspension of dihydrate crystals, while effective in bringing about acceptable setting times for the slurries, is similar to the ground block particles in the respect that it also loses its accelerating potency rapidly upon aging. This necessitates a continuous process for forming the aqueous suspension of the dihydrate crystals which in turn requires a relatively large apparatus to assure an adequate supply of the suspension during the manufacture of gypsum products. The equipment and operating costs for this method of forming the accelerator are relatively high.

SUMMARY OF THE INVENTION

It is therefore an object of this invention to provide a method of accelerating the setting time of a calcined gypsum slurry.

It is another object to provide such a method which requires a significantly lesser amount of the aqueous suspension of freshly hydrated, fine, calcium sulfate dihydrate crystals than was heretofore necessary.

Briefly stated, the present invention resides in the discovery of a means of greatly enhancing the accelerating potency of the aqueous suspension of freshly hydrated crystals when it is used to accelerate the setting times of calcined gypsum slurries. It has now been found that when a substantial percentage of the total water content of a calcined gypsum slurry is added in the form of a saturated calcium sulfate dihydrate solution, the amount of the aqueous suspension of freshly hydrated crystals necessary to bring about the desired setting time decreases markedly. The saturated calcium sulfate solution enhances the accelerating efficiency of the aqueous suspension of fresh dihydrate crystals rather than merely operating independently of the suspension to provide its own accelerating effect since the accelerating efficiency realized when the suspension and the saturated solution are used together is much greater than the combined effect which would be realized were they to operate independently of each other. In other words the accelerating effect exerted by the aqueous suspension added to that exerted by the saturated solution, were each used without the other, would not equal the accelerating efficiency realized when they are used together. This improved acceleration process can be conveniently incorporated into the normal manner of forming the calcined gypsum slurry thus obviating the need for additional equipment or processing steps. Lower processing costs are made possible through the use of this improved method. These and other objects of this invention will become readily apparent when considered in relation to the preferred embodiment as set forth in the specification.

It should be understood that when we refer herein to an aqueous suspension of freshly hydrated, fine, dihydrate crystals we mean a suspension formed by adding gypsum stucco particles to water greatly in excess, i.e., from about 2% to about 4%, of the amount that will go into solution. Thus when the suspension is formed in the accelerator tube it consists of freshly hydrated calcium sulfate dihydrate crystals suspended in a saturated calcium sulfate aqueous solution. When we refer to a saturated calcium sulfate dihydrate solution we mean one which has been formed by adding calcium sulfate to a volume of water in an amount slightly in excess, i.e., about 0.4%, of that which is soluble.

The present invention may be practiced with various methods for making various gypsum products. It is preferred to use it in the production of gypsum wallboard on a commercial scale wallboard forming machine, thus it will be described in detail with respect to its application in such a manufacturing process. Acceptable setting times for this process are realized when the slurry has an initial setting time of about three to four minutes and a final setting time of about eight to nine minutes. The initial setting time may be defined as the point at which about 50% of the calcined gypsum particles have been converted into the dihydrate state. This time can be determined by means of the ¼ pound Gilmore Test which requires a ¼ pound needle of the type which is available as No. 4-840 in the Fisher Scientific Company catalogue. The test is carried out by holding the needle in a vertical position and applying its point lightly to the surface of a part of the calcined gypsum slurry. The time, measured from the point at which the slurry is formed, which it takes the slurry to harden sufficiently to support the weight of the needle without having its tip break through the surface is the initial setting time. The final setting time is defined as being reached when substantially all of the calcined gypsum particles have been converted to the dihydrate form and can be determined as described above with the exception that a one pound needle is used or it can be measured by observing the temperature rise of the slurry after its formation. As the conversion of the gypsum particles from the hemi-hydrate form to the dihydrate form is an exothermic reaction, the point at which the temperature of the slurry ceases to increase will be the final setting time.

In the production of wall board on a commercial scale board forming machine and in particular the formation of the core portion, a part of the total water volume to be used in the slurry which will form the core is added to an accelerator tube along with an excess of fine, gypsum stucco particles to form the aqueous suspension wherein the stucco is hydrated and forms fine calcium sulfate dihydrate crystals. In some cases, where a lighter weight wallboard is desired, another part of the total water content of the slurry is added to a foam generator with an aqueous solution of detergent or soap and agitated therein to form a foam. The remainder of the slurry water content is charged into a beater along with starch, paper stock, a retarder and other additives. The mixture is agitated by the beater blades for approximately one hour. All of the components of the core formulation are then brought together in a pin mixer where they are agitated briefly to form a uniform slurry which is discharged at a controlled rate onto a sheet of wallboard face paper continuously advancing on a moving conveyor whereon the wallboard is formed. A second sheet of face paper is then disposed on top of the continuously advancing layer of slurry. The core is allowed to harden sufficiently so that the wallboard may be handled without being damaged and it is then placed on a conveyor which carries it through drying ovens where substantially all of the free water is removed.

The present invention is practiced with respect to the above described process by adding a sufficient amount of calcium sulfate, in hemi-hydrate or dihydrate form, to the beater to result in the formation of a solution saturated with respect to calcium sulfate. Thus, this saturated solution, when added to the calcined gypsum slurry with the other components of the formulation, will markedly enhance the accelerating potency of the aqueous suspension of freshly hydrated, fine, calcium sulfate dihydrate crystals. It is thought that the saturated calcium sulfate dihydrate solution accomplishes this result by substantially preventing the freshly hydrated calcium sulfate dihydrate crystals from going into solution when they are added to the slurry. Since a substantial amount of the water content of the slurry is now already saturated with calcium sulfate when it is added to the slurry, the fresh dihydrate crystals should substantially remain in that form, thus functioning as nuclei seed crystals to promote the conversion of the stucco particles to the dihydrate form and in this manner accelerating the setting of the slurry.

This novel acceleration method does not require an increased amount of calcium sulfate solids to function properly since the total amount necessary to form the saturated solution and the aqueous suspension of dihydrate crystals is slightly less than the amount required heretofore when only the aqueous suspension was used to accelerate the setting time of the slurry. In other words, the reduction in the amount of gypsum stucco needed to form the aqueous suspension of dihydrate crystals now made possible by the present invention is slightly greater than the amount of calcium sulfate needed to form the saturated solution. The total amounts of calcium sulfate solids needed to achieve comparable results with the two systems can be seen from the data shown in Table 1. It is readily evident that no additional equipment is needed nor are more processing steps required to carry out this improved method. In view of the reduced amount of the aqueous suspension of freshly hydrated dihydrate crystals required according to the practice of this invention it is also evident that the dimensions of the accelerator tube used to form the aqueous suspension of dihydrate crystals can be significantly reduced thus leading to lower equipment and operating costs. The processing costs for the manufacture of gypsum products can therefore be reduced.

Tests have shown that the use of a saturated calcium sulfate solution as a major percentage of the water content of the slurry from which gypsum products are formed does not increase the accelerating potency of freshly ground gypsum block particles. When the saturated solution was added to a calcined gypsum slurry along with the freshly ground block particles no improvement in the setting time of the slurry was observed. This result is illustrated by the data shown in Table 1. The data listed therein are taken from the production of gypsum wallboard on a commercial wallboard forming machine in the manner previously described. Gypsum stucco from one source was used in all of the boards in order to allow valid comparisons to be made. The data was obtained from the production of typical ½ inch wallboard which weighs about 1880 pounds per thousand square feet with a core weight of about 1740 pounds per thousand square feet. Of the total core weight shown above about 1490 pounds is gypsum stucco. All of the amounts listed in the table are in pounds per thousand square feet of wallboard except where otherwise designated.

TABLE 1

|  | 1 | 2 | 3 | 4 | 5 | 6 | 7 |
|---|---|---|---|---|---|---|---|
| Ground gypsum block | 5.56 | 5.56 |  |  |  |  |  |
| Gypsum stucco to form dihydrate crystals |  |  | 7.53 | 7.53 | 6.34 | 5.75 | 4.53 |
| Gypsum stucco in beater |  | 2.90 |  | 2.16 | 2.16 | 2.16 | 2.16 |
| Total accelerator solids | 5.56 | 8.46 | 7.53 | 9.69 | 8.50 | 7.91 | 6.69 |
| Initial setting time (minutes) | 3:30 | 3:30 | 3:30 | 2:30 | 2:40 | 2:50 | 3:25 |

The quantity of accelerator needed to satisfactorily accomplish its function is not capable of precise difinition in terms of the amount of solids primarily because gypsum stucco obtained from different sources is not always similar in the manner to which it lends itself to acceleration. Substantially identical setting times for calcined gypsum slurries formed with gypsum stucco from different locations can only be achieved by the addition of varying amounts of accelerator. Other variables such as the impurities present in the available water supply, the thickness of the product being made and the rate of production also have an effect on the amount of accelerator required. Consequently the invention will be further defined in relation to the percentage of the total water content of the slurry represented by the saturated solution. This percentage can vary considerably according to the type of product being made. For example, in the production of ¼ inch wallboard in which no foam is used up to about 85% of the total water content of the slurry may come from the mixture formed in the beater. In the case of ½ inch or ⅝ inch wallboard where foam is incorporated into the slurry the percentage of the total slurry water content contributed from the beater may be from about 50% to about 70%. Although the invention may be practiced by having the saturated solution contribute lesser or greater percentages of the water content of the slurry than those shown above it has been found that maximum efficiency for this process is achieved within that range. Therefore it is preferred to have the saturated solution represent from about 50% to about 85%, by volume, of the total water content of the slurry.

The saturated calcium sulfate solution may be formed by adding calcium sulfate whether in hemi-hydrate or dihydrate form to the water. It is preferred to use gypsum stucco for this purpose since it is readily available at the wallboard manufacturing plant. Preferably an amount equivalent to 0.4% by weight of the volume of water in the beater is added. The Handbook of Chemistry and Physics, 45th Ed. (1964–1965), lists the solubility of $CaSO_4 \cdot ½H_2O$ in cold water as 0.3% and that of $CaSO_4 \cdot 2H_2O$ as 0.24%. Thus, an excess of calcium sulfate is added in order to take the purity of the compound being added into consideration. Since the purity of the gypsum stucco which is preferred for forming the saturated solution may vary from about 75% to about 90% the addition of 0.4% will ensure a sufficient amount of calcium sulfate to form the saturated solution. Any excess solids which do not go into solution need not be filtered out of the solution. Such a procedure would be commercially impractical and has been found to be unnecessary in any event since tests have shown that the presence of a small amount of undissolved calcium sulfate particles does not adversely affect the acceleration of the setting time of the slurry nor does it affect the quality of the wallboard.

Example I

A 12" x 12" wallboard having a thickness of about ½ inch was prepared in the following manner:

An aqueous suspension of freshly hydrated, fine, calcium sulfate dihydrate crystals was formed by placing 7 grams of fine gypsum stucco particles and 330 cc. of water in a ball mill and then agitating the contents for eight minutes. A saturated calcium sulfate solution was prepared by adding 3.9 grams of gypsum stucco to 785 cc. of water with agitation. To this solution were added, with continued agitation, 5.73 grams starch, 8.0 grams of pulp and 1.0 gram of potassium sulfate. Foam was generated in a mixer by agitating 4.7 cc. of a 5% aqueous solution of a detergent soap and 115 cc. of water to a volume of 450 cc.

The saturated solution, the foam and 47 c. of the aqueous suspension containing 1.0 gram of the freshly hydrated, fine, calcium sulfate dihydrate crystals were brought together in a Hobart Mixer with 1050 grams of calcined gypsum stucco with agitation for a brief period to form a uniform slurry. The slurry was poured into a wallboard mold and allowed to set. The initial setting time was found to be 3:30 minutes as determined by the previously described ¼ pound Gillmore Test.

Example II

A wall board was prepared by the same procedure as that described in Example I using the same compounds and quantities listed therein. The only exception was in the preparation of the saturated calcium sulfate solution. After the 3.9 grams of gypsum stucco were added to the 785 cc. of water and agitated to form the saturated solution, it was filtered to remove the excess solids prior to the pulp, starch and potassium sulfate being added. The initial setting time for the slurry formed was found to be 3:30 minutes.

Another advantage of this saturated solution lies in the fact that it does not lose its ability to enhance the accelerating efficiency of the aqueous suspension of freshly hydrated, fine, calcium sulfate dihydrate crystals upon standing. Because of this characteristic of the solution it does not have to be formed just prior to the time that it is added to the calcined gypsum slurry in the pin mixer. Experiments have shown that the solution will retain its effectiveness in increasing the accelerating efficiency of the aqueous suspension of freshly hydrated crystals for up to 24 hours after it is formed.

Chemical accelerator additives such as potassium sulfate or the like may be use with the aqueous suspension of freshly hydrated crystals and the saturated calcium sulfate dihydrate solution. The use of such additives will decrease the amounts of the aqueous suspension of freshly hydrated crystals necessary to achieve the desired setting times.

Having described the invention in detail with respect to its preferred embodiment so that those skilled in the art may practice the same, we contemplate that variations may be made without departing from the essence of the invention or the scope of the appenedd claims.

What we claim is:

1. The method of accelerating the setting time of calcined gypsum in making a set gypsum product therefrom, comprising the steps of hydrating calcium sulfate hemi-hydrate in a first quantity of water, said first quantity of water being sufficient to produce an aqueous suspension of freshly hydrated crystals of calcium sulfate dihydrate, dissolving calcium sulfate in a second quantity of water in proportions providing a substantially saturated aqueous solution of calcium sulfate, combining and agitating said suspension, said solution and additional calcium sulfate hemi-hyrate whereby a settable gypsum slurry is formed, said solution providing the major portion of water in said slurry, said additional calcium sulfate hemi-hydrate providing the major portion of solids in said slurry, the ratio of solids to water permitting the setting of said slurry to form a unitary solid gypsum product, forming said slurry into a desired gypsum product shape and allowing said additional calcium sulfate hemi-hydrate to hydrate thus forming a unitary set gypsum product.

2. The method of claim 1 wherein the said substantially saturated aqueous solution of calcium sulfate has wood fiber dispersed therein.

3. The method of claim 1 wherein the said substantially saturated aqueous solution of calcium sulfate has wood fiber and starch dispersed therein.

4. The method of claim 1 wherein the said aqueous suspension of freshly hydrated calcium sulfate dihydrate crystals is formed by adding from about 2% to about 4% by weight of calcium sulfate hemi-hydrate to said first quantity of water.

5. The method of claim 1 wherein the said substantially saturated aqueous solution of calcium sulfate is formed by adding about 0.47 by weight of calcium sulfate to said second quantity of water.

6. The method of claim 1 wherein the said settable gypsum slurry is formed by combining said suspension, said solution and said additional calcium sulfate hemi-hydrate by continuously introducing a supply thereof into a containing means, continuously agitating said continuous supply within said containing means, continuously discharging the thus agitated continuous supply from said containing means onto continuously moving conveying means, and continuously forming gypsum wallboard on said conveying means.

7. The method of claim 1 wherein the said aqueous suspension of freshly hydrated calcium sulfate dihydrate crystals is formed by continuously introducing calcium sulfate hemi-hydrate and water into a containing means, and continuously agitating the contents of said containing means.

8. Tthe method of claim 7 wherein said contents of said containing means are agitated by disposing a plurality of inert grinding elements in said containing means and moving said elements one relative to another.

References Cited
UNITED STATES PATENTS

| | | | |
|---|---|---|---|
| 1,909,465 | 5/1933 | Hansen et al. | 106—110 |
| 1,915,603 | 6/1933 | Gough | 106—110 |
| 2,420,863 | 5/1947 | Charles | 106—115 |
| 3,189,511 | 6/1965 | White | 106—110 |
| 3,262,799 | 7/1966 | McCleary et al. | 106—110 |
| 3,432,318 | 3/1969 | Brown | 106—110 |

JAMES E. POER, Primary Examiner

PO-1050
(5/69)

UNITED STATES PATENT OFFICE
CERTIFICATE OF CORRECTION

Patent No. 3,592,670  Dated July 13, 1971

Inventor(s) Donald A. Kossuth, Daniel A. Winkowski and John W. Klems

It is certified that error appears in the above-identified patent and that said Letters Patent are hereby corrected as shown below:

Column 1, line 40, "stlurry" should be ---slurry---.

Column 3, line 4, "suspened" should be ---suspended---;

same column, line 27, "part" should be ---pat---.

Column 5, line 67, "47 c." should be ---47 cc.---.

Column 6, "wall board" should be ---wallboard---; (line 3)

same column, line 35, "appenedd" should be ---appended---;

same column, line 47, "hemi-hyrate" should be ---hemi-hydrate---.

Claim 5, 3rd line, "0.47" should be ---0.4%---.

Claim 8, 1st word, "Tthe" should be ---The---.

Signed and sealed this 18th day of January 1972.

(SEAL)
Attest:

EDWARD M. FLETCHER, JR.
Attesting Officer

ROBERT GOTTSCHALK
Acting Commissioner of Patents